(12) United States Patent
Lighty

(10) Patent No.: US 12,234,771 B1
(45) Date of Patent: Feb. 25, 2025

(54) BYPASS DUCT HEAT EXCHANGER MOUNT SYSTEM WITH REDUCED MOTION

(71) Applicant: Rolls-Royce North American Technologies Inc., Indianapolis, IN (US)

(72) Inventor: Kerry J. Lighty, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 37 days.

(21) Appl. No.: 18/228,265

(22) Filed: Jul. 31, 2023

(51) Int. Cl.
*F02C 7/20* (2006.01)
*F02C 7/18* (2006.01)

(52) U.S. Cl.
CPC .................. *F02C 7/20* (2013.01); *F02C 7/18* (2013.01); *F02C 7/185* (2013.01); *F05D 2240/91* (2013.01); *F05D 2260/213* (2013.01); *F05D 2260/96* (2013.01)

(58) Field of Classification Search
CPC ................................................. F28F 2275/205
See application file for complete search history.

(56) References Cited

U.S. PATENT DOCUMENTS

| | | | |
|---|---|---|---|
| 3,528,250 | A | 9/1970 | Johnson |
| 4,976,310 | A | 12/1990 | Jabs |
| 8,020,298 | B2 | 9/2011 | Campbell et al. |
| 8,157,503 | B2 | 4/2012 | Junod |
| 8,171,986 | B2 | 5/2012 | Klein |
| 8,510,945 | B2 | 8/2013 | Hand et al. |
| 9,267,390 | B2 | 2/2016 | Lo |
| 9,243,563 | B2 | 4/2016 | Lo |
| 9,587,561 | B2 | 3/2017 | Snyder et al. |
| 10,253,695 | B2 | 4/2019 | Duesler et al. |
| 10,287,982 | B2 | 5/2019 | Duesler et al. |
| 10,293,950 | B2 | 5/2019 | Ronski et al. |
| 10,323,540 | B2 | 6/2019 | Sennoun |
| 10,753,229 | B2 | 8/2020 | Olver |
| 10,989,071 | B2 | 4/2021 | Walsh et al. |
| 11,035,295 | B2 | 6/2021 | McGee et al. |
| 11,459,949 | B2 | 10/2022 | Modrzejewski |
| 11,492,973 | B2 | 11/2022 | Duesler et al. |
| 11,572,928 | B2 | 2/2023 | Duesler et al. |
| 2007/0295492 | A1 | 12/2007 | Sharp et al. |
| 2008/0017360 | A1 | 1/2008 | Campbell et al. |
| 2011/0146944 | A1 | 6/2011 | Hand et al. |
| 2018/0163808 | A1 | 6/2018 | Bauer et al. |

(Continued)

*Primary Examiner* — Todd E Manahan
*Assistant Examiner* — Alyson Joan Harrington
(74) *Attorney, Agent, or Firm* — Barnes & Thornburg LLP

(57) ABSTRACT

A gas turbine engine includes a bypass duct including an outer wall, a heat exchanger arranged within the bypass duct, and a turnbuckle assembly. The outer wall includes a main body and an access panel removably coupled to the main body. The turnbuckle assembly couples the heat exchanger to the access panel, and includes a first rod coupled to the access panel and a second rod coupled to the first rod and to the heat exchanger. The outer end of the first rod is threadably received in a socket of a socket housing removably coupled to the access panel such that the first rod is fixedly coupled to the socket housing to increase lateral stiffness of the heat exchanger and the turnbuckle assembly such that the lateral dynamic mode is outside of a fan rotor operating range.

14 Claims, 9 Drawing Sheets

(56) References Cited

U.S. PATENT DOCUMENTS

| | | |
|---|---|---|
| 2019/0203613 A1 | 7/2019 | Sennoun |
| 2022/0010728 A1* | 1/2022 | Hellegouarch ........... F02C 7/32 |
| 2022/0260018 A1 | 8/2022 | Sidorovich et al. |
| 2022/0403780 A1 | 12/2022 | Price et al. |

* cited by examiner

BYPASS DUCT HEAT EXCHANGER MOUNT SYSTEM WITH REDUCED MOTION

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat exchanger assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a bypass duct. A fan included in the gas turbine engine forces air into the compressor of the engine and may also provide additional thrust via forcing air around the engine core through the bypass duct. The bypass duct may include components configured to transfer heat between cooling fluids and the air flowing through the bypass duct. Some bypass duct designs must be wholly disassembled and reassembled to reach components within the bypass duct which may be labor and time intensive.

SUMMARY

The present disclosure may comprise one or more of the following features and combinations thereof.

A gas turbine engine according to a first aspect of the present disclosure includes a bypass duct, a heat exchanger, and a first turnbuckle assembly. The bypass duct is arranged circumferentially around a central axis of the gas turbine engine and includes an outer wall assembly defining an outer boundary of a flow path and an inner wall defining an inner boundary of the flow path, the outer wall assembly including a main annular wall body and an access panel removably coupled to the main annular wall body, the bypass duct configured to direct bypass air from an inlet of the gas turbine engine through the flow path. The heat exchanger is arranged within the bypass duct and is coupled to the access panel, the heat exchanger configured to receive at least a portion of the bypass air and to transfer heat from a cooling fluid passing through the heat exchanger to the portion of the bypass air.

In some embodiments, the first turnbuckle assembly couples the heat exchanger to the access panel, the first turnbuckle assembly including a first turnbuckle rod coupled to the access panel at a radially outer end of the first turnbuckle rod and a second turnbuckle rod coupled to the first turnbuckle rod and to the heat exchanger at a radially inner end of the second turnbuckle rod. The radially outer end of the first turnbuckle rod is threadably received in and engaged with a first threaded socket of a first socket housing removably coupled to the access panel such that the first turnbuckle rod is fixedly coupled to the first socket housing so as to increase lateral stiffness of the heat exchanger and the first turnbuckle assembly such that the lateral dynamic mode is outside of a fan rotor operating range of the gas turbine engine.

In some embodiments, the main annular wall body includes a first opening, and the access panel covers the first opening when removably coupled to the main annular wall body.

In some embodiments, the first socket housing extends radially inwardly such that the first threaded socket opens radially inwardly toward the heat exchanger.

In some embodiments, the access panel includes an opening through which the first socket housing extends, the first socket housing includes a main housing body and at least one first flange extending at least one of axially or circumferentially from the main housing body, a radially inner surface of the at least one first flange rests on a radially outer surface of the access panel, and the at least one first flange is coupled to the access panel.

In some embodiments, the first threaded socket is formed as a cavity in the main housing body, the cavity includes a radially outer portion having a first diameter and a radially inner portion radially adjacent to and opening into the radially outer portion, the radially inner portion having a second diameter greater than the first diameter.

In some embodiments, the radially outer portion of the cavity includes first threads on an inner annular surface of the radially outer portion, wherein a first radially outer portion of the first turnbuckle rod includes second threads that correspond to the first threads such that rotation of the first turnbuckle rod moves the first turnbuckle rod closer to or farther from the access panel.

In some embodiments, the radially inner portion of the cavity does not include threads such that an inner annular surface of the radially inner portion is smooth, and a second radially outer portion of the first turnbuckle rod radially inward of the first radially outer portion of the first turnbuckle rod includes a third diameter corresponding to the second diameter of the of the radially inner portion of the cavity such that the second radially outer portion of the first turnbuckle rod is in close tolerance pilot fit with the radially inner portion of the cavity.

In some embodiments, the second turnbuckle rod is arranged radially inwardly relative to the first turnbuckle rod and rotatably coupled to the first turnbuckle rod via a turnbuckle sleeve, and a radially inner end of the second turnbuckle rod includes a first spherical rod end bearing fastened to a first clevis arranged on the heat exchanger.

In some embodiments, the first spherical rod end bearing includes a fastening hole formed therein, the first spherical rod end bearing is oriented such that the fastening hole extends in an axial direction, and the first clevis is arranged on the heat exchanger such that a first fastener that extends through the first clevis and the fastening hole so as to couple the first spherical rod end bearing to the first clevis extends in the axial direction.

In some embodiments, the first clevis includes a first prong and a second prong each including a hole through which the first fastener extends, and a first side of the first spherical rod end bearing is spaced apart from one of the first and second prongs so as to allow for thermal expansion of the first turnbuckle assembly and the heat exchanger.

In some embodiments, the gas turbine engine further includes a second turnbuckle assembly configured to further couple the heat exchanger to the access panel, the second turnbuckle assembly including a third turnbuckle rod coupled to the access panel at a radially outer end of the third turnbuckle rod and a fourth turnbuckle rod coupled to the heat exchanger at a radially inner end of the fourth turnbuckle rod. The radially outer end of the third turnbuckle rod can be coupled to the access panel via a second spherical rod end bearing fastened to a second clevis arranged on the access panel.

In some embodiments, the radially inner end of the fourth turnbuckle rod is coupled to the heat exchanger via a third spherical rod end bearing fastened to a third clevis arranged on the heat exchanger.

In some embodiments, the opening of the access panel includes a width as measured in a circumferential direction that is greater than a width of the first socket housing as measured in the circumferential direction so as to allow for thermal expansion of the first turnbuckle assembly and the heat exchanger.

A gas turbine engine according to an additional aspect of the present disclosure includes a bypass duct including an outer wall defining an outer boundary of a flow path and including a main wall body and a first wall portion that is removable from the main wall body, a first component arranged within the bypass duct and coupled to the first wall portion, and a first turnbuckle assembly that couples the first component to the first wall portion, the first turnbuckle assembly including a radially inner end coupled to the first component and a radially outer end opposite the radially inner end fixedly coupled to the first wall portion so as to increase lateral stiffness of the first component and the first turnbuckle assembly.

In some embodiments, the main wall body includes a first opening, and the first wall portion covers the first opening when removably coupled to the main wall body.

In some embodiments, the first wall portion includes a first socket housing removably coupled to the first wall portion and including a first socket, the first turnbuckle assembly includes a first rod received within the first socket, and the first socket housing extends radially inwardly such that the first socket opens radially inwardly toward the first component.

In some embodiments, the first socket is a threaded socket formed as a cavity in a main housing body of the first socket housing, and the radially outer end of the first rod is threadably received in and engaged with the first socket of the first wall portion.

In some embodiments, the first turnbuckle assembly further includes a second rod arranged radially inwardly of and coupled to the first rod, and a radially inner end of the second rod includes a first spherical rod end bearing fastened to a first clevis arranged on the first component.

In some embodiments, the first clevis includes a first prong and a second prong each including a hole, a first fastener extends through the holes in the first and second prongs and a hole formed in the first spherical rod end bearing so as to couple the first spherical rod end bearing to the first clevis, and a first side of the first spherical rod end bearing is spaced apart one of the first and second prongs so as to allow for thermal expansion of the first turnbuckle assembly and the first component.

A method according to a further aspect of the present disclosure includes arranging a bypass duct circumferentially around a central axis of a gas turbine engine, the bypass duct including an outer wall assembly defining an outer boundary of a flow path and an inner wall defining an inner boundary of the flow path, the outer wall assembly including a main annular wall body and an access panel, the bypass duct configured to direct bypass air from an inlet of the gas turbine engine through the flow path. The method can further include removably coupling the access panel to the main annular wall body, and arranging a heat exchanger within the bypass duct, the heat exchanger configured to receive at least a portion of the bypass air and to transfer heat from a cooling fluid passing through the heat exchanger to the portion of the bypass air.

In some embodiments, the method can further include removably coupling a first socket housing to the access panel, the first socket housing including a first threaded socket, coupling a radially outer end of a first turnbuckle rod of a first turnbuckle assembly to the access panel by threadably engaging the radially outer end of the first turnbuckle rod in the first threaded socket of the first socket housing, and coupling a second turnbuckle rod of the first turnbuckle assembly to the first turnbuckle rod and to the heat exchanger at a radially inner end of the second turnbuckle rod so as to couple the heat exchanger to the access panel. The threaded engagement of the first turnbuckle rod with the first threaded socket of the first socket housing can fixedly couple the first turnbuckle rod to the first socket housing so as to increase lateral stiffness of the heat exchanger and the first turnbuckle assembly such that the lateral dynamic mode is outside of a fan rotor operating range of the gas turbine engine.

These and other features of the present disclosure will become more apparent from the following description of the illustrative embodiments.

DETAILED DESCRIPTION OF THE DRAWINGS

Figure 1:
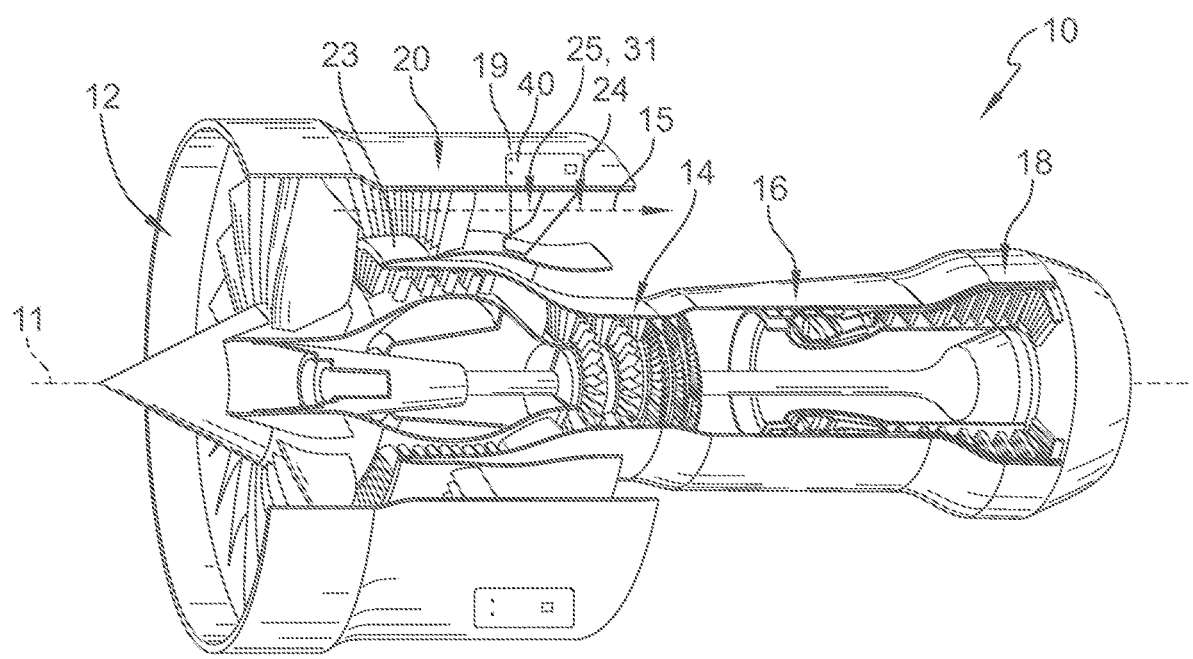
FIG. 1 is a cutaway view of a gas turbine engine that includes a fan, a compressor, a combustor downstream of the compressor, and a turbine downstream of the combustor, and showing an area in which an inlet cowl and a heat exchanger assembly downstream of the inlet cowl may be arranged.

For the purposes of promoting an understanding of the principles of the disclosure, reference will now be made to a number of illustrative embodiments illustrated in the drawings and specific language will be used to describe the same.

According to a first aspect of the present disclosure, a gas turbine engine 10 includes a bypass duct 20, a heat exchanger 32 coupled to an access panel 40 of an outer wall 19 of the bypass duct 20, and a mount assembly 42 including a first turnbuckle assembly 50 that couples the heat exchanger 32 to the access panel 40, as shown in FIGS. 1-3 and 6-10. The access panel 40 is removable from the remainder of the outer wall 19 such that the heat exchanger 32 is removable from the bypass duct 20. The radially outer end 56 of a first turnbuckle rod 55 of the first turnbuckle assembly 50 is fixedly coupled to a first socket housing 52 removably coupled to the access panel 40 so as to increase lateral stiffness (shown as direction 90 in FIG. 2) of the heat exchanger 32 and the first turnbuckle assembly 50 and the second turnbuckle assembly 70.

An illustrative aerospace gas turbine engine 10 includes a fan assembly 12 arranged in an inlet 13, a compressor 14, a combustor 16 located downstream of the compressor 14, and a turbine 18 located downstream of the combustor 16 as shown in FIG. 1. The fan assembly 12 is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 includes a fan 21, also referred to as a fan rotor 21, having a plurality of fan blades 22 that extend radially outward relative to the central axis 11 as shown in FIG. 1. The plurality of fan blades 22 rotate about the central axis 11 to force the air 15 through a flow path 24 such that the air 15 is directed through the bypass duct 20 to provide thrust to propel the gas turbine engine 10.

The bypass duct 20 is arranged circumferentially around the central axis 11 and includes an outer wall 19 and an inner wall 23 as shown in FIG. 1. The outer wall 19 defines a radially outer boundary of the flow path 24 of the bypass duct 20. The inner wall 23 defines a radially inner boundary of the flow path 24 of the bypass duct 20. The bypass duct 20 is configured to direct the air 15 through the flow path 24 to provide thrust to propel the gas turbine engine 10.

Figure 3:
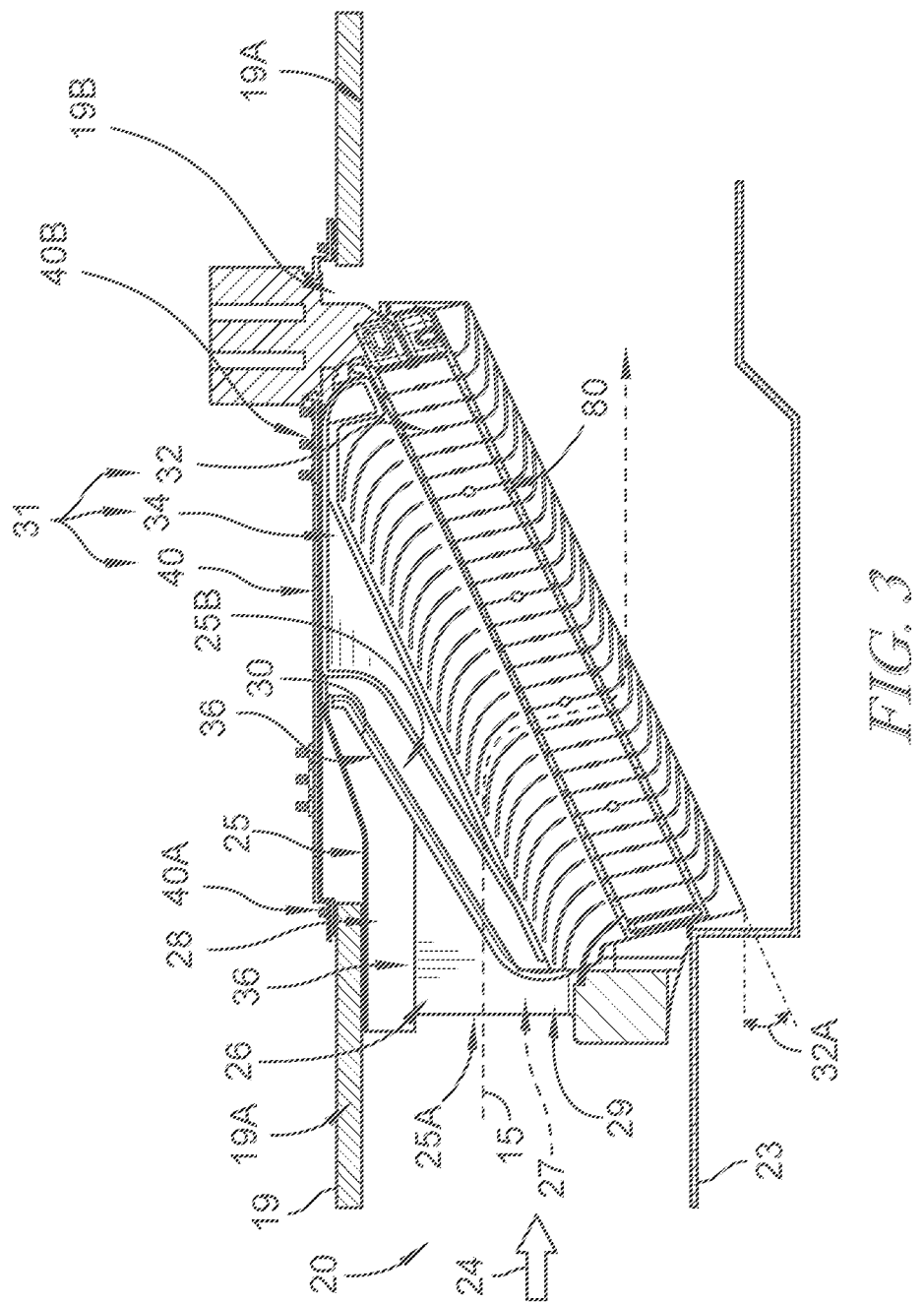
FIG. 3 is a side view of a bypass duct of the gas turbine engine of FIG. 1, showing that the bypass duct includes an outer wall and an inner wall that define a radially outer and inner boundary of a flow path for air through the bypass duct, that the inlet cowl and the heat exchanger assembly are arranged in the bypass duct, and that the heat exchanger assembly is removably coupled to the inlet cowl downstream of the inlet cowl and includes a heat exchanger and an inlet shroud coupled between the inlet cowl and the heat exchanger, and suggesting that the mount assembly may be arranged between the access panel and an upper side of the inlet shroud.

In the illustrative embodiment, the gas turbine engine 10 further includes an inlet cowl 25 and a heat exchanger assembly 31 including the heat exchanger 32, as shown in detail in FIG. 3. The inlet cowl 25 is arranged in the bypass duct 20. The heat exchanger 32 is arranged in the bypass duct 20 downstream of the inlet cowl 25.

The inlet cowl 25 includes a first side wall 26, a second side wall 27 spaced apart circumferentially from the first side wall 26, and a radially outer wall 28, as shown in FIG. 3. The outer wall 28 extends circumferentially between and interconnects the first side wall 26 and the second side wall 27. A portion of the outer wall 28 adjacent a forward end 29 of the inlet cowl 25 is coupled to the outer wall 19 of the bypass duct 20.

The inlet cowl 25 is configured to collect a portion of the air 15 flowing in the bypass duct 20, as shown in FIG. 3. The inlet cowl 25 extends between the forward end 29 and an aft end 30. The forward end 29 of the inlet cowl 25, in particular the forward areas of the side walls 26, 27 and the outer wall 28, define an inlet 25A that receives the portion of the air 15. The aft end 30 of the inlet cowl 25 defines an outlet 25B from which the portion of the air 15 exits. The portion of the air 15 exits the outlet 25B of the inlet cowl 25 and enters the heat exchanger 32.

Figure 4:
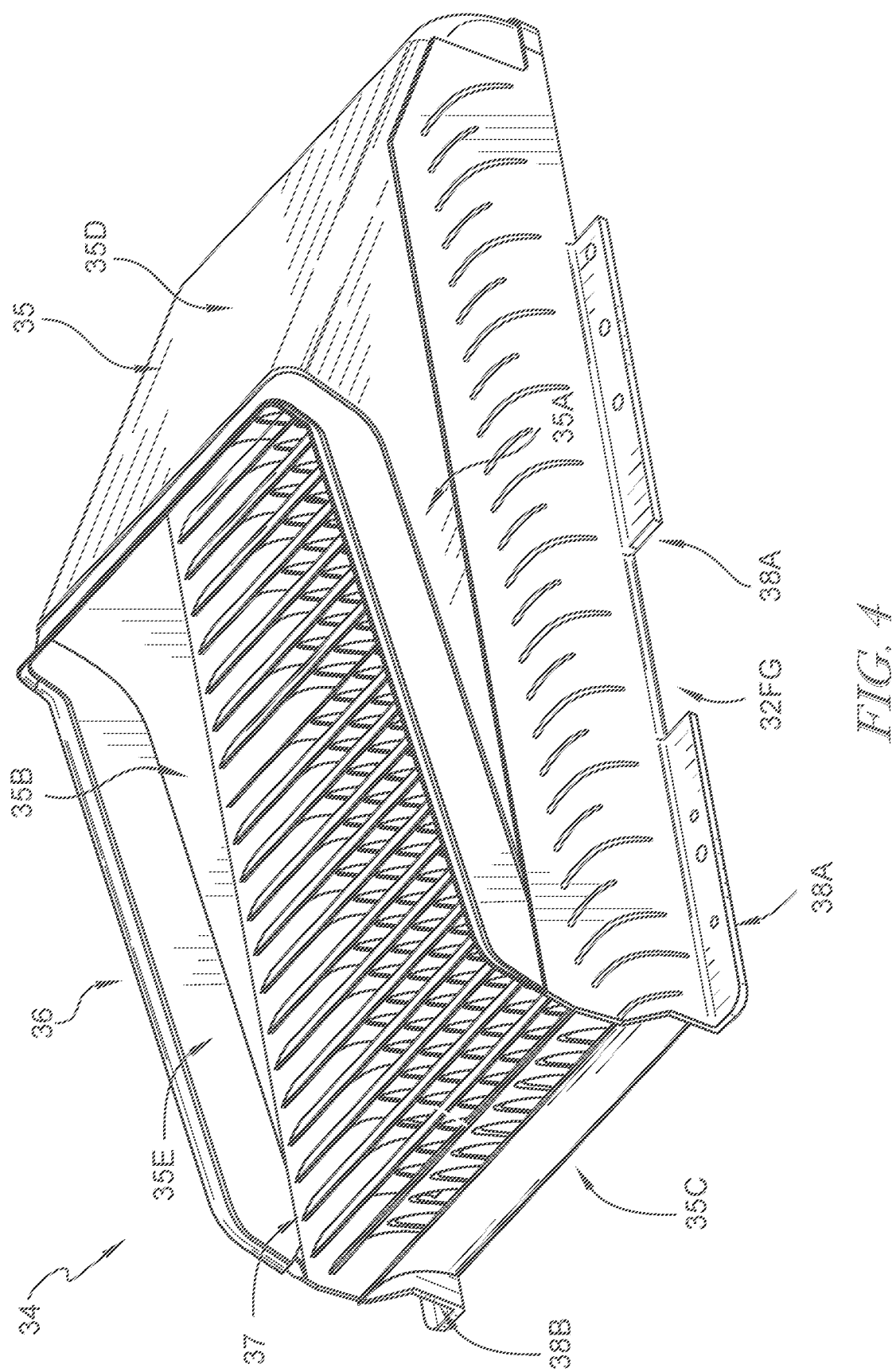
FIG. 4 is a perspective view of the inlet shroud of FIG. 3, showing that the inlet shroud includes a shroud housing and a compliant joint coupled with the shroud housing, and that the shroud housing may include flanges.

The heat exchanger assembly 31 includes the heat exchanger 32, an inlet shroud 34, and an access panel 40, as shown in FIG. 3 and in greater detail in FIG. 4. The heat exchanger 32, also referred to as a first component 32 by itself or in combination with the inlet shroud 34, is configured to transfer heat to the portion of the air 15 to cool a fluid 80 within the heat exchanger 32.

The heat exchanger 32 is coupled to the inlet shroud 34 downstream of the inlet shroud 34 as shown in FIG. 3. The heat exchanger 32 is arranged in the bypass duct 20 at an angle 32A relative to the flow path 24 through the bypass duct 20. In some embodiments, the angle 32A may be in a range of 10 degrees to 40 degrees. In some embodiments, the angle 32A may be in a range of 20 degrees to 30 degrees. In some embodiments, the angle 32A may be 25 degrees. The angle 32A of the heat exchanger 32 may aid in turning the bypass air 15 into and through the heat exchanger 32, while also potentially reducing pressure losses and improving heat transfer. In the illustrative embodiment, the heat exchanger 32 is configured for an orthogonal flow of the air 15 through the heat exchanger 32. The heat exchanger 32 extends radially between the outer wall 19 and the inner wall 23 of the bypass duct 20.

The inlet shroud 34 of the heat exchanger assembly 31 includes a shroud housing 35, a compliant joint 36, and a plurality of inlet turning vanes 37, as shown in FIG. 4. The inlet shroud 34 is arranged around and coupled to the heat exchanger 32, and is also engaged with the outlet 25B of the inlet cowl 25 to direct the portion of the air 15 through the heat exchanger 32. In some embodiments, the inlet shroud 34 is made of metallic materials.

The shroud housing 35 may include side walls 35A, 35B spaced apart from each other in the circumferential direction and a lower end wall 35C extending between the side walls 35A, 35B, as shown in FIG. 4. The shroud housing 35 may further include an angled top wall 35D that is generally parallel with the access panel 40 and extending from the compliant joint 36, which extends around forward edges of the side walls 35A, 35B and the top wall 35D. Together, the forward edges of the side walls 35A, 35B and the top wall 35D, and the radially outer (i.e. top edge) of the lower end wall 35C define an opening 35E. The compliant joint 36 is engaged with the aft end 30 of the inlet cowl 25 along the outlet 25B such that the air 15 flows into the turning vanes 36 via the opening 35E. The plurality of inlet turning vanes 37 are configured to adjust a direction of the portion of the air 15 entering the heat exchanger 32.

Illustratively, the shroud housing 35 can further include first flanges 38A and second flanges 38B, as shown in FIG. 4. The first flanges 38A extend outwardly away from the first side wall 35A. In some embodiments, the first side wall 35A and the first flanges 38A are substantially perpendicular to each other. The second flanges 38B extend outwardly away from the second side wall 35B. In some embodiments, the second side wall 35B and the second flanges 38B are substantially perpendicular to each other. The first flanges 38A and the second flanges 38B may be coupled to the heat exchanger 32. In some embodiments, the shroud housing 35 may include two flanges 38A, 38B extending away from each side wall 35A, 35B. As will be described in greater detail below, the turnbuckle assemblies 50, 70 extend from the access panel 40 and are coupled to the heat exchanger 32.

As shown in FIGS. 1 and 3, the outer wall 19 is generally annular and extends around the central axis 11. In some embodiments, the outer wall 19 is segmented, partially segmented, or formed as a single annular ring that extends entirely circumferentially around the central axis 11. Illustratively, the outer wall 19, also referred to as an outer wall assembly 19, may include a main annular wall body 19A, also referred to as a main wall body 19A. The outer wall assembly 19 further includes an opening 19B formed in the main annular wall body 19A covered by a single access panel 40, also referred to as a first wall portion 40, or a plurality of openings 19B around the circumference of the main annular wall body 19A each covered by an access panel 40. In some embodiments, the size of the access panel 40 may be slightly larger than the opening 19B in the main annular wall body 19A.

Figure 2:
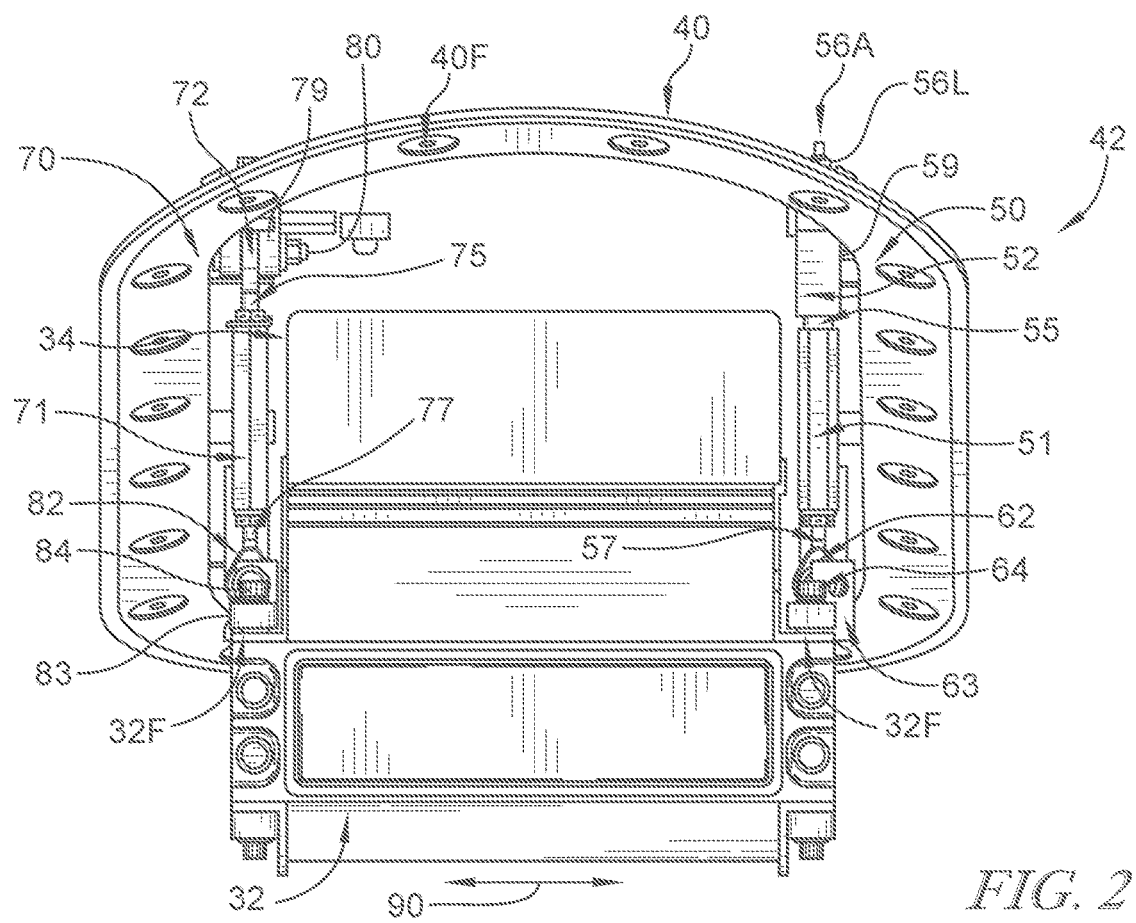
FIG. 2 is a front view of a portion of the bypass duct of the gas turbine engine of FIG. 1, showing that the heat exchanger assembly is arranged within the bypass duct and coupled to a removable access panel via a mount assembly including first and second turnbuckle assemblies, and suggesting that removal of the access panel removes the heat exchanger assembly from the bypass duct, and showing that the first turnbuckle assembly includes a first turnbuckle rod fixedly coupled to the access panel.

Each access panel 40 may be removably coupled to the main annular wall body 19A and also coupled to a respective heat exchanger 32, thus allowing for removal of the heat exchanger 32 and the inlet shroud 34 from the bypass duct 20. The access panel 40 can be coupled to the main annular wall body 19A via fasteners at least at an axially forward end 40A and an axially aft end 40B of the access panel 40. As can be seen in FIG. 2, the access panel 40 can include additional fastener holes 40F through which fasteners may extend and further couple the access panel 40 to the main annular wall body 19A.

As shown in FIGS. 2 and 3, the access panel 40 can be formed as a generally flat piece that extends circumferentially and axially. In some embodiments, the outer surface of the access panel 40 matches the curvature of the main annular wall body 19A in the circumferential direction. A person skilled in the art will understand that the access panel 40 may be formed of other shapes and sizes based on the design requirements of the engine 10. As a non-limiting example, the access panel 40 may be entirely level instead of curved, may be much larger than the opening 19B in the main annular wall body 19A, or may even cover multiple openings 19B in the main annular wall body 19A.

As briefly described above, the engine 10 further includes a mount assembly 42 including a first turnbuckle assembly 50 that couples the heat exchanger 32 to the access panel 40, as shown in detail in FIGS. 2 and 6-10. The radially outer end 56 of the first turnbuckle rod 55 of the first turnbuckle assembly 50, also referred to as a radially outer end 56 of the first turnbuckle assembly 50 itself, is fixedly coupled to the first socket housing 52, which is removably coupled to the access panel 40. The fixed coupling provides the benefit of increasing lateral stiffness (shown as direction 90 in FIG. 2) of the heat exchanger 32 and the first turnbuckle assembly 50 and the second turnbuckle assembly 70.

IG. 5 shows an exemplary mount assembly 42' that does not include a fixed coupling at the radially outer end of a first turnbuckle rod 55' of the first turnbuckle assembly 50', but instead a spherical rod end bearing 52' coupled to the access panel 40'. The mount assembly 42' includes similar spherical rod end bearings 62', 72', 82' for coupling the first and second turnbuckle assemblies 50', 70' to the access panel 40' and the heat exchanger 32'.

Utilizing only spherical rod end bearings 52', 62', 72', 82', and not a fixed coupling as disclosed herein, causes undesirable and excessive lateral movement in the direction 90, which causes a lateral dynamic mode of vibration of the heat exchanger 32' and the first turnbuckle assembly 50' and the second turnbuckle assembly 70'. In order to reduce increase lateral stiffness of the heat exchanger 32 and turnbuckle assemblies 50, 70, and in particular such that the lateral dynamic mode is outside of a fan rotor 21 operating range of the gas turbine engine 10, the first turnbuckle assembly 50 includes the fixed coupling to the access panel 40 touched on above and described in greater detail below.

Figure 8:
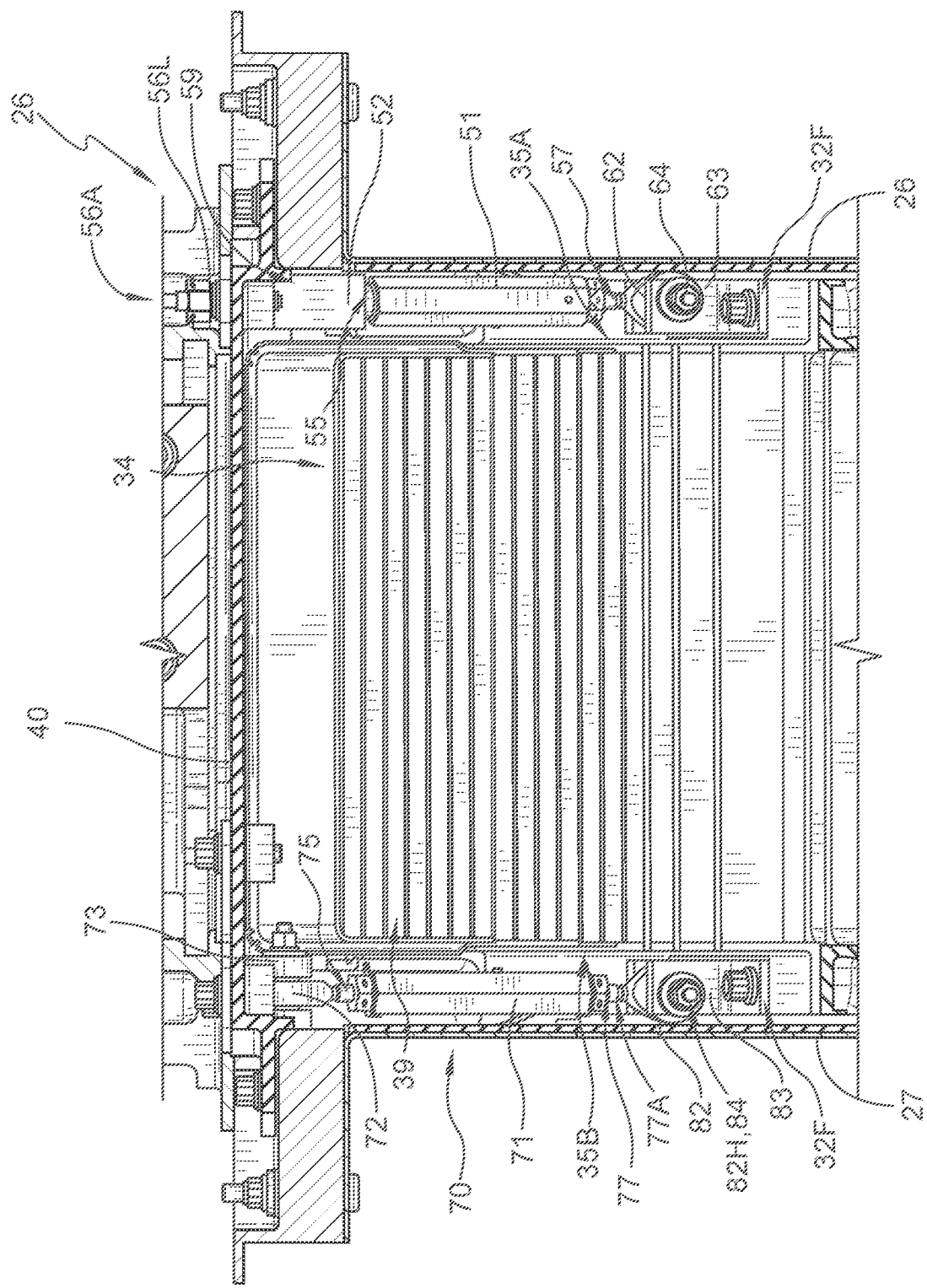
FIG. 8 is an angled front view of the portion of the bypass duct of FIG. 2, showing the components of FIG. 2 and showing the inlet cowl outside of the inlet shroud and the first and second turnbuckle assemblies between the compliant joints of the inlet shroud and the side walls of the inlet cowl.

As shown in FIGS. 2 and 8, the first turnbuckle assembly 50 includes a first turnbuckle sleeve 51, a first socket housing 52, a first turnbuckle rod 55, a second turnbuckle rod 57, and a first spherical rod end bearing 62. The second turnbuckle assembly 70 is circumferentially spaced apart from the first turnbuckle assembly 50 and includes a first turnbuckle sleeve 71, a first socket housing 72, a first turnbuckle rod 75, a second turnbuckle rod 77, and a first spherical rod end bearing 82.

Illustratively, the second turnbuckle rod 57 is arranged radially inwardly relative to the first turnbuckle rod 55 and is rotatably coupled to the first turnbuckle rod 55 via the turnbuckle sleeve 51, as shown in FIGS. 2 and 8. The sleeve 51 may include threads on an inner surface of the sleeve 51 that engage threads formed on the outer surface of the first and second turnbuckle rods 55, 57. The threads on a radially outer end of the sleeve 51 and the corresponding threads of the first turnbuckle rod 55 may extend in a "right-hand" direction, and the threads on a radially inner end of the sleeve 51 and the corresponding threads of the second turnbuckle rod 55 may extend in a "left-hand" direction opposite the "right-hand" direction such that rotation of the sleeve 51 in one rotational direction will move the first and second turnbuckle rods 55, 57 toward each other and rotation of the sleeve 51 in the opposing rotational direction will move the first and second turnbuckle rods 55, 57 away from each other. As such, a distance between the inlet shroud 34, including the heat exchanger 32, and the access panel 40 can be adjusted.

Figure 6:
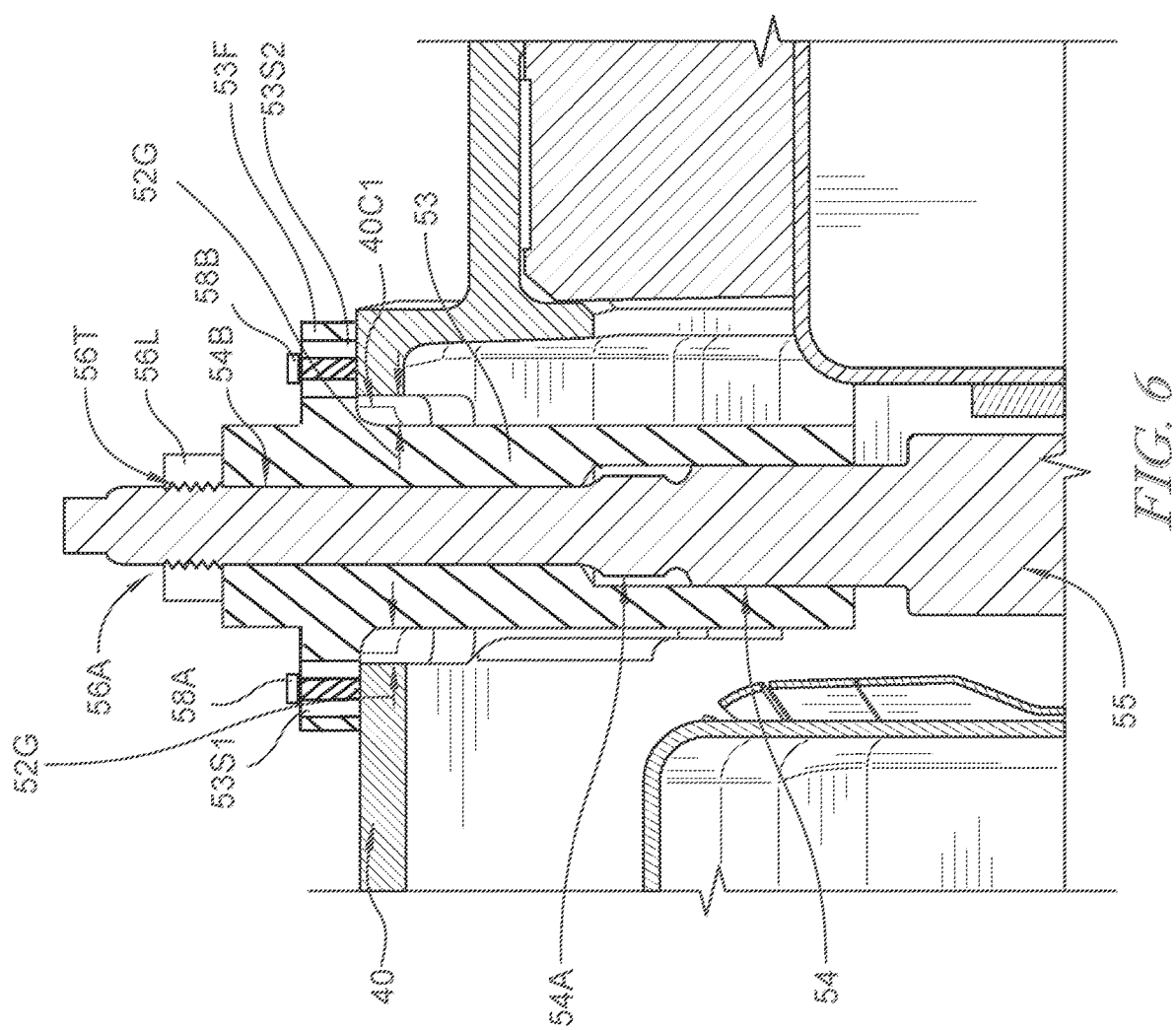
FIG. 6 is an enlarged front view of the radially outer end of the first turnbuckle rod of FIG. 2 and a socket housing removably coupled to the access panel, showing that the socket housing includes flanges for removably coupling the socket housing to the access panel.

As shown in FIG. 2 and in greater detail in FIG. 6, the first turnbuckle rod 55 is threadably received in a first threaded socket 54 of the first socket housing 52 and thus fixedly coupled to the first socket housing 52. Illustratively, the first socket housing 52 includes a main housing body 53 that is generally elongated and may be formed as to be cylindrical, prismatic, or any other shape that would accommodate the first threaded socket 54 therein.

When mounted to the access panel 40, the first socket housing 52 extends radially, in particular with more of the housing body 53 arranged radially inward of the access panel 40 than radially outside of the access panel 40, as shown in FIG. 6. The first threaded socket 54 opens radially inwardly toward the heat exchanger 32. Illustratively, the access panel 40 includes a first opening 40C1 through which the first socket housing 52 extends. The opening 40C1 may be slotted or elongated, or in other words formed to be wider than the width of the main housing body 53, as measured in the circumferential direction.

As a result of the sizing of the opening 40C1, at least one gap 52G is formed between an inner surface of the opening 40C1 and the corresponding outer side of the housing body 53, and in some embodiments, gaps 52G may be formed on both circumferential sides of the housing body 53, as viewed in FIG. 6. The gap 52G or gaps 52G improve ease of installation of the components of the access panel 40, the heat exchanger assembly 31, and the first turnbuckle assembly 50. In some embodiments, a gap or gaps may be formed between axial sides of the housing body 53 and the opening 40C1 so as to improve ease of installation of the access panel 40, the heat exchanger assembly 31, and the first turnbuckle assembly 50. These gaps may also provide for effective alignment of the housing 52 with the first clevis 63 and first spherical rod end bearing 62.

As shown in FIG. 6, the first socket housing 52 includes at least one flange 53F arranged at a radially outer end 53A of the main housing body 53 and extending at least one of axially or circumferentially from the main housing body 53. In some embodiments, the flange 53F may extend around a perimeter or circumference of the housing body 53. A radially inner surface of the flange 53F rests on a radially outer surface of the access panel 40 and may be coupled to the access panel 40 such that the first socket housing 52 is fixedly coupled to the access panel 40. In some embodiments, the flange 53F may include slots 53S1, 53S2 formed on opposing sides of the main housing body 53, as shown in FIG. 6. The slots 53S1, 53S2 may be formed with an elongated shape with straight sides and rounded ends (i.e. "racetrack" shape, or "stadium" shape), and fasteners 58A, 58B may be inserted into each slot 53S1, 53S2 and coupled to the access panel 40. The elongated shape allows for adjustment during installation. In some embodiments, the slots 53S1, 53S2 extend circumferentially the same distance as the opening 40C1.

Figure 7:
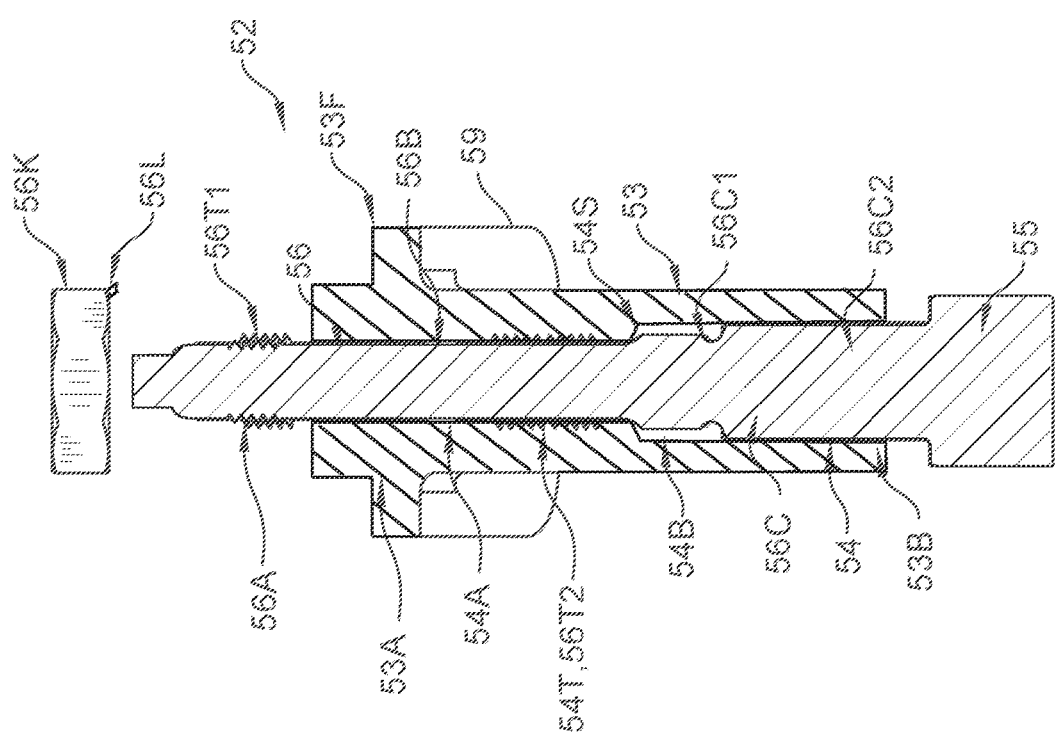
FIG. 7 is a cross-sectional view of a radially outer end of the first turnbuckle rod of FIGS. 2 and 6, showing that the radially outer end includes threads that engage with threads of a socket housing removably coupled to the access panel, and showing that the radially outer end further includes threads for retention of a key lock washer that prevents rotation of the first turnbuckle rod.

As shown in FIG. 7, the first threaded socket 54 is formed as a cavity in the main housing body 53. The first threaded socket 54 opens radially inwardly at a second end 53B of the housing body 53. In some embodiments, the first threaded socket 54 includes a radially outer portion 54A having a first diameter and a radially inner portion 54B radially adjacent to and opening into the radially outer portion 54A. The radially inner portion 54B has a second diameter greater than the first diameter of the radially outer portion 54A. This creates a step 54S in the threaded socket 54.

Illustratively, the radially outer portion 54A of the first threaded socket 54 includes first threads 54T on an inner annular surface of the radially outer portion 54A, as shown in FIG. 7. Correspondingly, a radially middle portion 56B of the first turnbuckle rod 55, also referred to as a first radially outer portion, located between an radially outermost portion 56A of the first turnbuckle rod 55 and a radially innermost portion 56C of the first turnbuckle rod 55, includes second threads 56T2 that correspond to the first threads 54T such that rotation of the first turnbuckle rod 55 moves the first turnbuckle rod 55 in and out of the threaded socket 54, and thus closer to or farther from the access panel 40. In this way, the radially outer end 56 of the first turnbuckle rod 55 is fixedly coupled to the first socket housing 52 and thus to the access panel 40.

As can be seen in FIG. 7, the radially inner portion 54B of the first threaded socket 54 does not include threads such that an inner annular surface of the radially inner portion 54B is smooth. The radially innermost portion 56C of the first turnbuckle rod 55, also referred to as a second radially outer portion of the first turnbuckle rod 50, includes a third diameter corresponding to the second diameter of the of the radially inner portion 54B of the first threaded socket 54 such that the radially innermost portion 56C of the first turnbuckle rod 55 is in close tolerance pilot fit with the radially inner portion 54B of the first threaded socket 54. The close tolerance rod 55 and socket 54 configuration prevents excessive side-to-side motion, and thus aids in increasing the lateral stiffness. In some embodiments, the radially innermost portion 56C of the first turnbuckle rod 55 may include a top portion 56C1 having a smaller diameter than a radially inner, lower portion 56C2, and a larger diameter than the radially middle portion 56B of the first turnbuckle rod 55.

In some embodiments, as shown in FIG. 7, the radially outermost portion 56A of the radially outer end 56 of the first turnbuckle rod 55 further includes threads 56T1 for retention of a key lock washer 56K having corresponding threads so as to prevent rotation of the first turnbuckle rod 55 and holds the rod 55 in place. In particular, the key lock washer 56K is arranged on the radially outermost portion 56A once the first socket housing 52 and the first turnbuckle rod 55 are in place within the access panel 40, and is positioned that a lock tab 56L of the key lock washer 56K engages with a corresponding slot that may be formed on the socket housing 52 so as to lock the key lock washer 56K in place.

Figure 9:
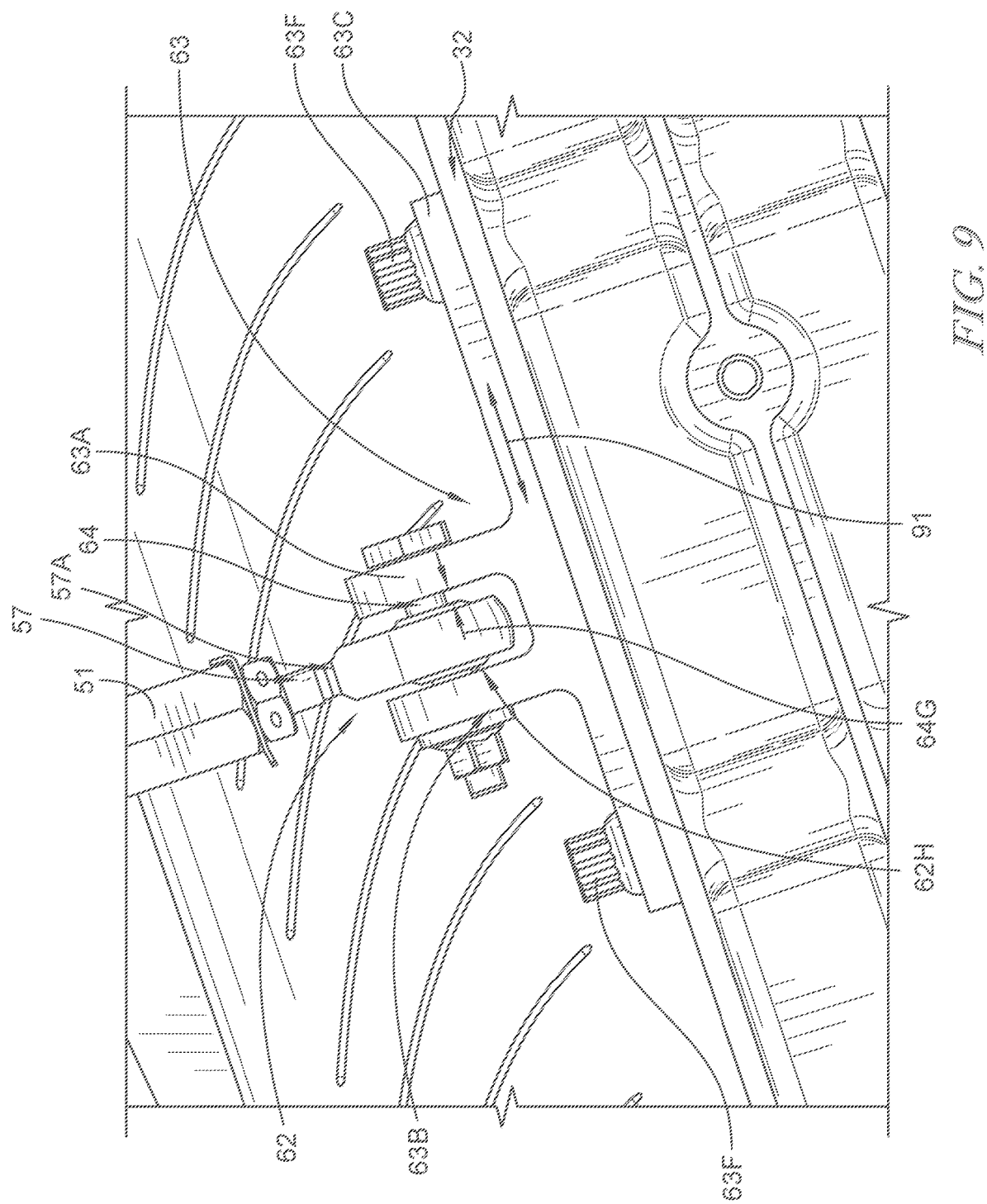
FIG. 9 is an enlarged side view of a radially inner end of the first turnbuckle rod of FIG. 2, showing that the radially inner end is coupled to the heat exchanger via a spherical rod end bearing and clevis connection, and showing that a gap is formed between the end bearing and at least one prong of the clevis to allow for thermal expansion of the first turnbuckle assembly.

As shown in FIGS. 8 and 9, a radially inner end 57A of the second turnbuckle rod 57, also referred to as a radially inner end 57A of the first turnbuckle assembly 50 itself, includes a first spherical rod end bearing 62 fastened to a first clevis 63 arranged on and coupled to the heat exchanger 32. The first spherical rod end bearing 62 includes a fastening hole 62H formed therein. The first spherical rod end bearing 62 is oriented such that the fastening hole 62H extends in an axial direction. The first clevis 63 may include a first prong 63A and a second prong 63B spaced apart from the first prong 63A, each including a hole therethrough. Each of the first and second prongs 63A, 63B extends radially outwardly away from a base 63C of the first clevis 63 that is fastened to the heat exchanger 32 via fasteners 63F. In some embodiments, the heat exchanger 32 may include flanges 32F, the first clevis 63 being coupled to one of the flanges 32F, as shown in FIGS. 2 and 8. In some embodiments, the flanges 32F may be axially offset from the flanges 38A, 38B (see FIG. 4) such that the flanges 32F are axially aligned with a gap 32FG between the flanges 38A, 38B. As a result, the turnbuckles 50, 70 may extend between the flanges 38A, 38B, past the inlet shroud 34, and couple to the heat exchanger 32.

As shown in FIG. 9, a first fastener 64 that extends through the holes formed in the first and second prongs 63A, 63B and the fastening hole 62H so as to rotatably couple the first spherical rod end bearing 62 to the first clevis 63. The fastener 64 extends in the axial direction. As will be described below, this orientation of the fastener 64 allows for installation of the spherical rod end bearing 62 between the inlet cowl 25 and the inlet shroud 34. Illustratively, a first side of the first spherical rod end bearing 62 is spaced apart from one of the first and second prongs 63A, 63B such that a gap 64G is formed between the first side of the bearing 62 and the prongs 63A, 63B so as to allow for thermal expansion of the first turnbuckle assembly 50 and the inlet shroud 34 and heat exchanger 32 components in the axial direction, indicated by arrow 91 in FIG. 9.

Figure 5:
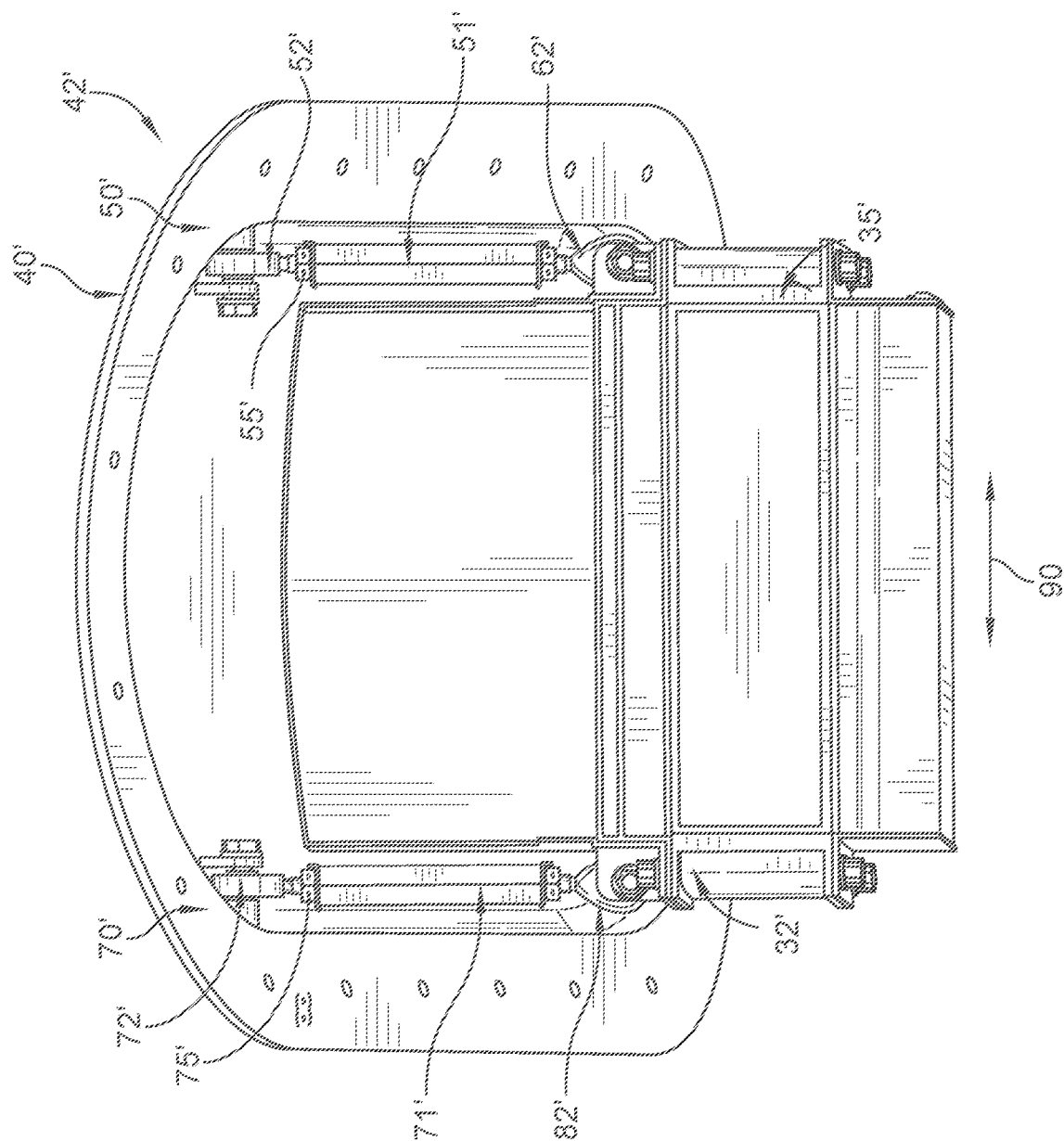
FIG. 5 is a front view of the mount assembly of FIG. 2, showing two turnbuckle assemblies that each are not fixedly coupled to the access panel.
Figure 10:
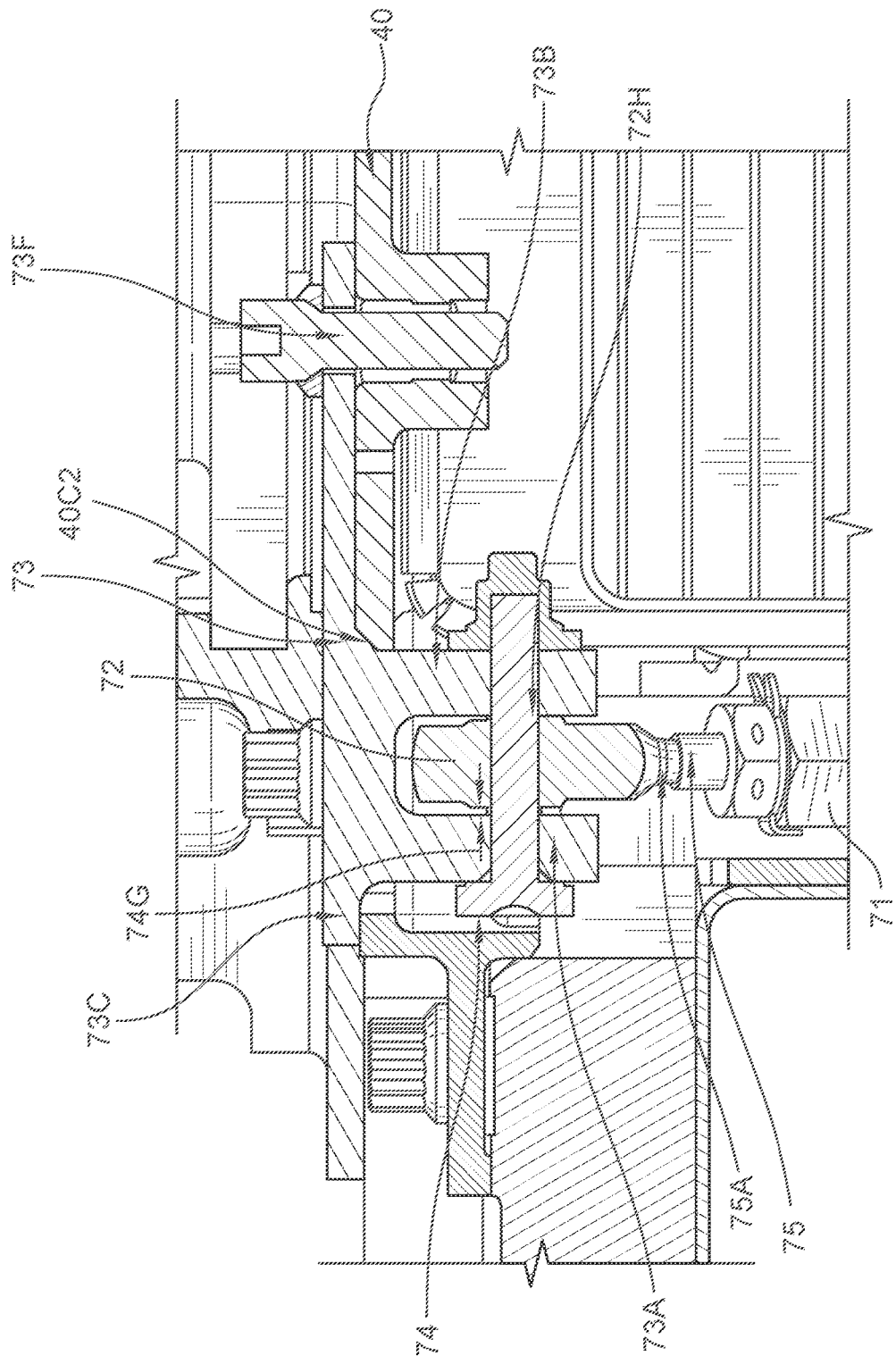
FIG. 10 is an enlarged front view of a radially outer end of a second turnbuckle rod of the second turnbuckle assembly of FIG. 2, showing that the radially outer end is coupled to the access panel via a spherical rod end bearing and clevis connection, and showing that the clevis is part of a clevis mount plate that is removably coupled to the access panel.

As shown in FIGS. 8 and 10, the second turnbuckle assembly 70 is arranged similarly to the second turnbuckle assembly 70' shown in FIG. 5. Specifically, the second turnbuckle assembly 70 is configured to further couple the heat exchanger 32 to the access panel 40. The second turnbuckle assembly 70 includes a third turnbuckle rod 75 coupled to the access panel 40 at a radially outer end 75A of the third turnbuckle rod 75 and a fourth turnbuckle rod 77 coupled to the third clevis 83, and thus to the heat exchanger 32, at a radially inner end 77A of the fourth turnbuckle rod 77. A sleeve 71 configured and arranged similarly to the sleeve 51 described above is coupled to the third and fourth turnbuckle rods 75, 77.

Illustratively, the radially outer end 75A of the third turnbuckle rod 75 is coupled to the access panel 40 via a second spherical rod end bearing 72 fastened to a second clevis 73 arranged on the access panel 40, as shown in FIG. 10. The second clevis is formed similarly to the first clevis 63 described above, in particular to include two prongs 73A, 73B and a base 73C. The prongs 73A, 73B extend through a second opening 40C2 formed in the access panel 40, and the base 73C is fixedly coupled to the access panel 40 via a fastener 73F that extends through the base 73C and through the access panel 40. The spherical rod end bearing 72 is rotatably coupled to the second clevis 73 via a fastener 74 that extends through a fastening hole 72H of the spherical rod end bearing 72 and the prongs 73A, 73B of the second clevis 73. Illustratively, the second spherical rod end bearing 72 is oriented such that the fastening hole 72H and the fastener 74 extend in the circumferential direction. A first side of the second spherical rod end bearing 72 is spaced apart from one of the first and second prongs 73A, 73B such that a gap 74G is formed between the first side of the bearing 72 and the prongs 73A, 73B so as to allow for thermal expansion of the second turnbuckle assembly 70 and the inlet shroud 34 and heat exchanger 32 components in the circumferential direction 90.

As shown in FIG. 8, the radially inner end 77A of the fourth turnbuckle rod 77 is coupled to the third clevis 83, and thus to the heat exchanger 32. A third spherical rod end bearing 82 is rotatably coupled to the third clevis 83 via a fastener 84, and the third clevis 83 is coupled to the heat exchanger 32, in particular via a flange 32F of the heat exchanger 32. Illustratively, the configuration of the third spherical rod end bearing 82, the third clevis 83, and the fastener 84 are the same as the first spherical rod end bearing 62 described above, in particular in that the fastener hole 82H of the bearing 82 and the fastener 84 extend in the axial direction 91.

As can be seen in FIG. 8, the first and second turnbuckle assemblies 50, 70 are sized so as to be arranged between the inlet cowl 25 and the inlet shroud 34. In particular, the first turnbuckle assembly 50 is arranged between the first side wall 26 of the inlet cowl 25 and the first side wall 35A of the shroud housing 35 of the inlet shroud 34. Similarly, the second turnbuckle assembly 70 is arranged between the second side wall 27 of the inlet cowl 25 and the second side wall 35B of the shroud housing 35 of the inlet shroud 34. The arrangement of the turnbuckle assemblies 50, 70 in this constricted space is enabled by the orientation of the first and third spherical rod end bearings 62, 82, in particular in that each is oriented such that their respective fasteners 64, 84 extend in the axial direction 91.

As described above, utilizing the first turnbuckle rod 55, fixedly coupled to the first socket housing 52, provides the benefit of increasing the lateral stiffness of the heat exchanger 32 and the first turnbuckle assembly 50 and second turnbuckle assembly 70. This arrangement effectively moves the lateral dynamic mode out of the fan rotor 21 operating range. Moreover, the close tolerance arrangement of the first turnbuckle rod 55 and the first threaded socket 54 prevents excessive side-to-side motion, thus aiding in increasing the overall lateral stiffness of the system.

Further benefits are provided in the packaging constraints of the disclosed configurations of the turnbuckle assemblies 50, 70, the inlet cowl 25, the inlet shroud 34 and the heat exchanger 32, and the access panel 40. The turnbuckle assemblies 50, 70 should fit in the constricted area formed between the inlet shroud 34 and the inlet cowl 25. The second and third spherical rod end bearings 72, 82 are oriented perpendicular (with the fastening hole 82H third spherical rod end bearing 82 extending axially) to each other due to the constricted area between the inlet shroud 34 and the inlet cowl 25. This orientation of the upper and lower spherical rod end bearings 72, 82 allows for installation of the fasteners 74, 84 in the constricted area. Similarly, the orientation of the first spherical rod end bearing 62 (with the fastening hole 62H third spherical rod end bearing 62 extending axially) allows for installation of the fastener 64 in the constricted area.

The second clevis 73 connected to the second spherical rod end bearing 72 is separable from the access panel 40, thus allowing for the second turnbuckle assembly 70 to be connected and then inserted through the opening 40C2 of the access panel 40. This installation of the second turnbuckle assembly 70, in particular installation of the fastener 74 of the second spherical rod end bearing 72 may prove difficult or impossible due to limited space if the second spherical rod end bearing 72 were not separable from the access panel 40.

Additionally, as described above, the various gaps, such as the gaps 52G (circumferential or axial) between the opening 40C1 in the access panel 40 and the socket housing 52, and the gaps formed between each spherical rod end bearing 62, 72, 82 and its corresponding clevis 63, 73, 83, provide for improved alignment of all components, as well as extra space for thermal expansion of all components.

A method according to a further aspect of the present disclosure includes a first operation of arranging a bypass duct 20 circumferentially around a central axis 11 of a gas turbine engine 10, the bypass duct 20 including an outer wall assembly 19 defining an outer boundary of a flow path 24 and an inner wall 23 defining an inner boundary of the flow path 24, the outer wall assembly 19 including a main annular wall body 19A and an access panel 40, the bypass duct 20 configured to direct bypass air 15 from an inlet 13 of the gas turbine engine 10 through the flow path 24. The method can further include a second operation of removably coupling the access panel 40 to the main annular wall body 19A, and a third operation of arranging a heat exchanger 32 within the bypass duct 20, the heat exchanger 32 configured to receive at least a portion of the bypass air 15 and to transfer heat from a cooling fluid 80 passing through the heat exchanger 32 to the portion of the bypass air 15.

The method can further include a fourth operation of removably coupling a first socket housing 52 to the access panel 40, the first socket housing 52 including a first threaded socket 54, a fifth operation of coupling a radially outer end 56 of a first turnbuckle rod 55 of a first turnbuckle assembly 50 to the access panel 40 by threadably engaging the radially outer end 56 of the first turnbuckle rod 55 in the first threaded socket 54 of the first socket housing 52, and a sixth operation of coupling a second turnbuckle rod 57 of the first turnbuckle assembly 50 to the first turnbuckle rod 55 and to the heat exchanger 32 at a radially inner end 57A of the second turnbuckle rod 57 so as to couple the heat exchanger 32 to the access panel 40.

In some embodiments of the method, the threaded engagement of the first turnbuckle rod 55 with the first threaded socket 54 of the first socket housing 52 fixedly couples the first turnbuckle rod 55 to the first socket housing 52 so as to increase the lateral stiffness of the heat exchanger 32 and the first turnbuckle assembly 50 and second turnbuckle assembly 70 such that the lateral dynamic mode is outside of a fan rotor 21 operating range of the gas turbine engine 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a bypass duct arranged circumferentially around a central axis of the gas turbine engine, the bypass duct including an outer wall assembly defining an outer boundary of a flow path and an inner wall defining an inner boundary of the flow path, the outer wall assembly including a main annular wall body and an access panel removably coupled to the main annular wall body, the bypass duct configured to direct bypass air from an inlet of the gas turbine engine through the flow path,
a heat exchanger arranged within the bypass duct and coupled to the access panel, the heat exchanger configured to receive at least a portion of the bypass air and to transfer heat from a cooling fluid passing through the heat exchanger to the portion of the bypass air, and
a first turnbuckle assembly that couples the heat exchanger to the access panel, the first turnbuckle assembly including a first turnbuckle rod coupled to the access panel at a radially outer end of the first turnbuckle rod and a second turnbuckle rod coupled to the first turnbuckle rod and to the heat exchanger at a radially inner end of the second turnbuckle rod, wherein the radially outer end of the first turnbuckle rod is threadably received in and engaged with a first threaded socket of a first socket housing removably coupled to the access panel such that the first turnbuckle rod is fixedly coupled to the first socket housing so as to increase lateral stiffness of the heat exchanger and the first turnbuckle assembly such that the lateral dynamic mode is outside of a fan rotor operating range of the gas turbine engine.

2. The gas turbine engine of claim 1, wherein the main annular wall body includes a first opening, and wherein the access panel covers the first opening when removably coupled to the main annular wall body.

3. The gas turbine engine of claim 2, wherein the first socket housing extends radially inwardly such that the first threaded socket opens radially inwardly toward the heat exchanger.

4. The gas turbine engine of claim 3, wherein the access panel includes an opening through which the first socket housing extends, wherein the first socket housing includes a main housing body and at least one first flange extending at least one of axially or circumferentially from the main housing body, wherein a radially inner surface of the at least one first flange rests on a radially outer surface of the access panel, and wherein the at least one first flange is coupled to the access panel.

5. The gas turbine engine of claim 4, wherein the first threaded socket is formed as a cavity in the main housing body, and wherein the cavity includes a radially outer portion having a first diameter and a radially inner portion radially adjacent to and opening into the radially outer portion, the radially inner portion having a second diameter greater than the first diameter.

6. The gas turbine engine of claim 5, wherein the radially outer portion of the cavity includes first threads on an inner annular surface of the radially outer portion, and wherein a first radially outer portion of the first turnbuckle rod includes second threads that correspond to the first threads such that rotation of the first turnbuckle rod moves the first turnbuckle rod closer to or farther from the access panel.

7. The gas turbine engine of claim 6, wherein the radially inner portion of the cavity does not include threads such that an inner annular surface of the radially inner portion is smooth, and wherein a second radially outer portion of the first turnbuckle rod radially inward of the first radially outer portion of the first turnbuckle rod includes a third diameter corresponding to the second diameter of the of the radially inner portion of the cavity such that the second radially outer portion of the first turnbuckle rod is in close tolerance pilot fit with the radially inner portion of the cavity.

8. The gas turbine engine of claim 3, wherein the second turnbuckle rod is arranged radially inwardly relative to the first turnbuckle rod and rotatably coupled to the first turnbuckle rod via a turnbuckle sleeve, and wherein a radially inner end of the second turnbuckle rod includes a first spherical rod end bearing fastened to a first clevis arranged on the heat exchanger.

9. The gas turbine engine of claim 8, wherein the first spherical rod end bearing includes a fastening hole formed therein, wherein the first spherical rod end bearing is oriented such that the fastening hole extends in an axial direction, and wherein the first clevis is arranged on the heat exchanger such that a first fastener that extends through the first clevis and the fastening hole so as to couple the first spherical rod end bearing to the first clevis extends in the axial direction.

10. The gas turbine engine of claim 9, wherein the first clevis includes a first prong and a second prong each including a hole through which the first fastener extends, and wherein a first side of the first spherical rod end bearing is spaced apart from one of the first and second prongs so as to allow for thermal expansion of the first turnbuckle assembly and the heat exchanger.

11. The gas turbine engine of claim 3, further comprising:
a second turnbuckle assembly configured to further couple the heat exchanger to the access panel, the second turnbuckle assembly including a third turnbuckle rod coupled to the access panel at a radially outer end of the third turnbuckle rod and a fourth turnbuckle rod coupled to the heat exchanger at a radially inner end of the fourth turnbuckle rod,
wherein the radially outer end of the third turnbuckle rod is coupled to the access panel via a second spherical rod end bearing fastened to a second clevis arranged on the access panel.

12. The gas turbine engine of claim 11, wherein the radially inner end of the fourth turnbuckle rod is coupled to the heat exchanger via a third spherical rod end bearing fastened to a third clevis arranged on the heat exchanger.

13. The gas turbine engine of claim 4, wherein the opening of the access panel includes a width as measured in a circumferential direction that is greater than a width of the first socket housing as measured in the circumferential direction so as to allow for thermal expansion of the first turnbuckle assembly and the heat exchanger.

14. A method comprising
arranging a bypass duct circumferentially around a central axis of a gas turbine engine, the bypass duct including an outer wall assembly defining an outer boundary of a flow path and an inner wall defining an inner boundary of the flow path, the outer wall assembly including a main annular wall body and an access panel, the bypass duct configured to direct bypass air from an inlet of the gas turbine engine through the flow path,
removably coupling the access panel to the main annular wall body,
arranging a heat exchanger within the bypass duct, the heat exchanger configured to receive at least a portion of the bypass air and to transfer heat from a cooling fluid passing through the heat exchanger to the portion of the bypass air,
removably coupling a first socket housing to the access panel, the first socket housing including a first threaded socket,
coupling a radially outer end of a first turnbuckle rod of a first turnbuckle assembly to the access panel by threadably engaging the radially outer end of the first turnbuckle rod in the first threaded socket of the first socket housing, and
coupling a second turnbuckle rod of the first turnbuckle assembly to the first turnbuckle rod and to the heat exchanger at a radially inner end of the second turnbuckle rod so as to couple the heat exchanger to the access panel,
wherein the threaded engagement of the first turnbuckle rod with the first threaded socket of the first socket housing fixedly couples the first turnbuckle rod to the first socket housing so as to increase lateral stiffness of the heat exchanger and the first turnbuckle assembly such that the lateral dynamic mode is outside of a fan rotor operating range of the gas turbine engine.

* * * * *